(12) United States Patent
Lin et al.

(10) Patent No.: US 11,923,891 B2
(45) Date of Patent: Mar. 5, 2024

(54) NON-ORTHOGONAL MULTIPLE ACCESS (NOMA) MULTI-LAYER TRANSMISSION METHOD AND APPARATUS THEREFOR

(71) Applicant: DATANG MOBILE COMMUNICATIONS EQUIPMENT CO., LTD., Beijing (CN)

(72) Inventors: Xiangli Lin, Beijing (CN); Zheng Zhao, Beijing (CN); Bin Ren, Beijing (CN); Yanping Xing, Beijing (CN)

(73) Assignee: DATANG MOBILE COMMUNICATIONS EQUIPMENT CO.,LTD., Beijing (CN)

( * ) Notice: Subject to any disclaimer, the term of this patent is extended or adjusted under 35 U.S.C. 154(b) by 177 days.

(21) Appl. No.: 17/423,910

(22) PCT Filed: Jan. 13, 2020

(86) PCT No.: PCT/CN2020/071833
§ 371 (c)(1),
(2) Date: Jul. 19, 2021

(87) PCT Pub. No.: WO2020/147693
PCT Pub. Date: Jul. 23, 2020

(65) Prior Publication Data
US 2022/0085845 A1    Mar. 17, 2022

(30) Foreign Application Priority Data
Jan. 18, 2019   (CN) ......................... 201910048770.6

(51) Int. Cl.
*H04B 1/707*        (2011.01)
(52) U.S. Cl.
CPC .................................. *H04B 1/707* (2013.01)

(58) Field of Classification Search
CPC ....... H04B 1/707; H04B 1/69; H04J 13/0077; H04J 13/18; H04J 13/004; H04J 99/00; H04W 24/02; H04L 5/0026; H04L 5/0037
See application file for complete search history.

(56) References Cited

U.S. PATENT DOCUMENTS

| 2017/0238261 A1 | 8/2017 | Benjebbour et al. |
| 2018/0083666 A1 | 3/2018 | Bayesteh et al. |

(Continued)

FOREIGN PATENT DOCUMENTS

| CN | 106576013 A | 4/2017 |
| CN | 107294659 A | 10/2017 |

(Continued)

OTHER PUBLICATIONS

CATT,"NOMA transmitter side signal processing",3GPP TSG RAN WG1 Meeting #94, Gothenburg, Sweden, Aug. 20-24, 2018, total 11 pages, R1-1808386.

(Continued)

*Primary Examiner* — Kabir A Timory
(74) *Attorney, Agent, or Firm* — Kilpatrick Townsend & Stockton LLP

(57) ABSTRACT

Disclosed are a non-orthogonal multiple access (NOMA) multi-layer transmission method and an apparatus therefor. The method includes: a terminal determines a spread spectrum sequence group for NOMA multi-layer transmission, with the terminal being configured for NOMA multi-layer transmission, and the spread spectrum sequence group includes N spread spectrum sequences, the N spread spectrum sequences correspond to N data layers, the N spread spectrum sequences are mutually orthogonal, N is the number of data layers of NOMA multi-layer transmission, and N is an integer greater than 1; and the terminal sends data, the (Continued)

data comprising the N data layers using the spread spectrum sequence group for spectrum spreading.

12 Claims, 5 Drawing Sheets

(56) References Cited

U.S. PATENT DOCUMENTS

2020/0077402 A1\* 3/2020 Lei .................. H04L 1/0003
2022/0231725 A1\* 7/2022 Herath ............ H04L 27/2614

FOREIGN PATENT DOCUMENTS

| CN | 107508661 A | 12/2017 |
| CN | 108462556 A | 8/2018 |
| CN | 108737307 A | 11/2018 |
| CN | 109155791 A | 1/2019 |
| WO | 2018054280 A1 | 3/2018 |

OTHER PUBLICATIONS

CATT, "Discussion on the design of POMA", 3GPP TSG RAN WG1 Meeting #95, Spokane, USA, Nov. 12-16, 2018, total 7 pages, R1-1812609.

ZTE, "Email discussion to collect detailed description of the NOMA schemes", 3GPP TSG RAN WG1 Meeting #94, Gothenburg, Sweden, Aug. 20-24, 2018, total 4 pages, R1-1809844.

Mingtal He, "Researches on Pattern Division Multiple Access Applications in Next Generation Mobile Communication System", Southwest Jiaotung University Master Degree Thesis, May 8, 2017, total 61 pages, sections 2.1, 2.2.3 and 3.3.2.

\* cited by examiner $$\begin{array}{l} \text{Resource 1} \\ \text{Resource 2} \\ \text{Resource 3} \\ \text{Resource 4} \end{array} \begin{bmatrix} 1 & 1 & 1 & 0 & 1 & 1 \\ 1 & 1 & 0 & 1 & i & -i \\ 1 & -1 & 1 & 0 & 1 & 1 \\ 1 & -1 & 0 & 1 & -i & i \end{bmatrix}$$

$$\phantom{xxxxxxxx}\text{User 1}\ \ \text{User 2}\ \ \text{User 3}\ \ \text{User 4}\ \ \text{User 5}\ \ \text{User 6}$$

Fig. 2

$$\begin{array}{l} \text{Resource 1} \\ \text{Resource 2} \\ \text{Resource 3} \\ \text{Resource 4} \end{array} \begin{bmatrix} 1 & 1 & 1 & 0 & 1 & 1 & 1 & 1 & 1 & 0 & 1 & 0 \\ 1 & 1 & 0 & 1 & i & -i & 1 & 1 & 0 & 1 & i & -i \\ 1 & -1 & 1 & 0 & 1 & 1 & 1 & 0 & 1 & 0 & 0 & 1 \\ 1 & -1 & 0 & 1 & -i & i & 0 & 1 & 1 & -1 & -i & i \end{bmatrix}$$

$$\phantom{xx}\text{User 1}\ \ \ \text{User 2}\ \ \ \text{User 3}\ \ \ \text{User 4}\ \ \ \text{User 5}\ \ \ \text{User 6}$$

Fig. 3 determining, by a terminal, a spread spectrum sequence group for NOMA multi-layer transmission, the terminal is configured for the NOMA multi-layer transmission, the spread spectrum sequence group comprises N spread spectrum sequences, the N spread spectrum sequences correspond to N data layers, the N spread spectrum sequences are mutually orthogonal, N is a quantity of data layers of the NOMA multi-layer transmission, and N is an integer greater than 1 — S401 sending, by the terminal, data; the data comprises the N data layers spread by using the spread spectrum sequence group — S402

Fig. 4 determining, by network equipment, a spread spectrum sequence group used by a terminal for NOMA multi-layer transmission, the terminal is configured for the NOMA multi-layer transmission, the spread spectrum sequence group includes N spread spectrum sequences, the N spread spectrum sequences correspond to N data layers, that is, the N spread spectrum sequences and the N data layers are in a one-to-one correspondence relation and one data layer uses one spread spectrum sequence for spreading, the N spread spectrum sequences are mutually orthogonal, N is a quantity of data layers of the NOMA multi-layer transmission, and N is an integer greater than 1 — S501 receiving, the network equipment, data sent by the terminal, the data including the N data layers using the spread spectrum sequence group for spreading — S502

Fig. 5

NON-ORTHOGONAL MULTIPLE ACCESS (NOMA) MULTI-LAYER TRANSMISSION METHOD AND APPARATUS THEREFOR

CROSS REFERENCE TO RELATED APPLICATIONS

The present disclosure is a National Stage of International Application PCT/CN2020/071833, filed Jan. 13, 2020, which claims priority to the Chinese Patent Application No. 201910048770.6, filed to the China National Intellectual Property Administration on Jan. 18, 2019 and entitled "NOMA MULTI-LAYER TRANSMISSION METHOD AND APPARATUS THEREFOR", the entire contents of which are incorporated herein by reference.

FIELD

The present disclosure relates to the field of wireless communication, in particular to a non-orthogonal multiple access (NOMA) multi-layer transmission method and an apparatus therefor.

BACKGROUND

With the development and change of mobile communication service requirements, many organizations such as the International Telecommunication Union (ITU) have begun to study new wireless communication systems (namely 5G NR, 5 Generation New RAT) for future mobile communication systems. Similar to the traditional Time Division Multiple Access (TDMA), frequency division multiple access (FDMA) and Code Division Multiple Access (CDMA) technologies, the Patten Division Multiple Access (PDMA) technology, as a key technology in the future 5G, can enable multiple users to transmit data on the same time domain, frequency domain and spatial domain resources, and distinguish them by coding domain and power domain, to improve the spectrum efficiency of cell and edge users, and increase the number of cell access users. Similarly, a same user can use multiple layers for transmission, and the transmission data of multiple layers are transmitted on the same time domain, frequency domain and spatial domain resources, and are distinguished by the coding domain, the power domain, phases, etc.

For non-orthogonal Multiple Access (NOMA) multi-layer transmission, if the spread spectrum sequences used in multi-layer transmission of same User Equipment (UE, also called a terminal) are not completely orthogonal, the performance will be affected, especially in the case of high bit rate.

At present, there is no solution to the problem that the spread spectrum sequences used in NOMA multi-layer transmission are not completely orthogonal.

SUMMARY

Embodiments of the present disclosure provide a NOMA multi-layer transmission method and an apparatus therefor.

In one embodiment, a NOMA multi-layer transmission method is provided, including:

determining, by a terminal, a spread spectrum sequence group for NOMA multi-layer transmission; the terminal is configured for the NOMA multi-layer transmission, and the spread spectrum sequence group includes N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and sending, by the terminal, data, the data including the N data layers spread by using the spread spectrum sequence group.

In a possible implementation, determining, by the terminal, the spread spectrum sequence group for the NOMA multi-layer transmission includes: determining, by the terminal, a spread spectrum sequence group for the NOMA multi-layer transmission according to configuration information of the spread spectrum sequence group sent by network equipment, and the configuration information of the spread spectrum sequence group is used for indicating the spread spectrum sequence group configured for the terminal.

In a possible implementation, determining, by the terminal, the spread spectrum sequence group for the NOMA multi-layer transmission includes: selecting, by the terminal, a spread spectrum sequence group for the NOMA multi-layer transmission from a spread spectrum sequence pool;

the spread spectrum sequence pool includes M spread spectrum sequence groups, spread spectrum sequences in each of the M spread spectrum sequence groups are mutually orthogonal, and M is an integer greater than 1.

In a possible implementation, the method further includes: sending, by the terminal, the configuration information of the selected spread spectrum sequence group to the network equipment.

In a possible implementation, the spread spectrum sequence pool is preconfigured or agreed by a system.

In a possible implementation, the spread spectrum sequence pool includes 48 spread spectrum sequence groups, each of the 48 spread spectrum sequence groups includes two mutually orthogonal spread spectrum sequences, and each of the two spread spectrum sequence includes four vector elements.

In a possible implementation, the spread spectrum sequence pool is shown in a table as follows:

| Spread spectrum sequence group number | Spread spectrum sequence | | | |
|---|---|---|---|---|
| 1 | 1 | $i$ | $-1$ | $-i$ |
|   | 1 | $-i$ | $-1$ | $i$ |
| 2 | 1 | $-1$ | $1$ | $-1$ |
|   | 1 | $-1$ | $-1$ | $1$ |
| 3 | 1 | $-1$ | $-i$ | $i$ |
|   | 1 | $-1$ | $i$ | $-i$ |
| 4 | 1 | $i$ | $-i$ | $-1$ |
|   | 1 | $-i$ | $i$ | $-1$ |
| 5 | 1 | $i$ | $-i$ | $i$ |
|   | 0 | $1$ | $0$ | $-1$ |
| 6 | 1 | $-1$ | $1$ | $i$ |
|   | 1 | $0$ | $-1$ | $0$ |
| 7 | 1 | $i$ | $0$ | $-1$ |
|   | 1 | $-i$ | $-1$ | $0$ |
| 8 | 1 | $0$ | $i$ | $-1$ |
|   | 0 | $1$ | $-i$ | $-1$ |
| 9 | 1 | $-i$ | $i$ | $-i$ |
|   | 1 | $-1$ | $-i$ | $1$ |
| 10 | 1 | $-1$ | $1$ | $-i$ |
|   | 1 | $i$ | $-1$ | $1$ |
| 11 | 1 | $0$ | $-1$ | $i$ |
|   | 0 | $1$ | $i$ | $-1$ |
| 12 | 1 | $-i$ | $0$ | $i$ |
|   | 1 | $i$ | $-1$ | $0$ |
| 13 | 0 | $1$ | $-1$ | $1$ |
|   | 1 | $i$ | $0$ | $-i$ |

-continued

| Spread spectrum sequence group number | Spread spectrum sequence | | | |
|---|---|---|---|---|
| 14 | 1 | −1 | 1 | 0 |
|    | 1 | 0  | −1 | −i |
| 15 | 1 | 0  | −i | −1 |
|    | 1 | 0  | i  | 0 |
| 16 | 1 | −i | 0  | −1 |
|    | 0 | 1  | 0  | i |
| 17 | 1 | −i | −1 | 1 |
|    | 1 | 1  | i  | −1 |
| 18 | 1 | −1 | i  | 1 |
|    | 1 | i  | −1 | −1 |
| 19 | 1 | 0  | 0  | −1 |
|    | 1 | −1 | 0  | 1 |
| 20 | 1 | 1  | −i | −1 |
|    | 0 | 0  | 1  | i |
| 21 | 1 | −i | −1 | −1 |
|    | 0 | 1  | i  | 0 |
| 22 | 1 | 1  | 0  | −1 |
|    | 1 | 0  | −1 | 1 |
| 23 | 1 | 0  | −1 | −1 |
|    | 1 | i  | 1  | 0 |
| 24 | 1 | i  | i  | −1 |
|    | 0 | 1  | 0  | −i |
| 25 | 1 | i  | −1 | i |
|    | 1 | −i | 1  | i |
| 26 | 1 | i  | 1  | −i |
|    | 1 | −i | −1 | −i |
| 27 | 1 | 0  | −i | 0 |
|    | 1 | −1 | i  | 0 |
| 28 | 1 | −i | −i | −1 |
|    | 1 | i  | 0  | 0 |
| 29 | 1 | −i | 0  | 0 |
|    | 0 | 0  | 1  | −i |
| 30 | 0 | 0  | 1  | −i | 0 |
|    | 0 | 1  | i  | 1 |
| 31 | 0 | 1  | −i | 1 |
|    | 1 | −i | 1  | 0 |
| 32 | 0 | 1  | i  | −i |
|    | 1 | −1 | 0  | −i |
| 33 | 0 | 1  | −1 | −i |
|    | 1 | −i | −i | 0 |
| 34 | 1 | i  | −i | 0 |
|    | 1 | 0  | i  | −i |
| 35 | 1 | −1 | −i | 0 |
|    | 0 | 1  | −i | i |
| 36 | 1 | i  | −i | 1 |
|    | 1 | −i | i  | 1 |
| 37 | 0 | 1  | −1 | i |
|    | 1 | i  | i  | 0 |
| 38 | 1 | −i | i  | 0 |
|    | 0 | 1  | 1  | −i |
| 39 | 1 | −1 | 1  | 1 |
|    | 1 | 1  | −1 | 1 |
| 40 | 1 | −1 | i  | −1 |
|    | 1 | 1  | −1 | i |
| 41 | 1 | i  | 1  | −1 |
|    | 1 | −i | i  | i |
| 42 | 1 | −i | 1  | −1 |
|    | 1 | −1 | −1 | −i |
| 43 | 1 | −1 | −i | −1 |
|    | 1 | i  | i  | −i |
| 44 | 1 | 1  | −i | 0 |
|    | 0 | 1  | i  | i |
| 45 | 0 | 1  | −i | −i |
|    | 1 | 1  | i  | 0 |
| 46 | 1 | 1  | 1  | −i |
|    | 1 | −1 | −i | −i |
| 47 | 0 | 1  | 1  | i |
|    | 0 | 1  | −1 | 0 |
| 48 | 1 | −1 | 0  | 0 |
|    | 0 | 0  | 1  | −1 |

In one embodiment, a NOMA multi-layer transmission method is provided, including:

determining, by network equipment, a spread spectrum sequence group used by a terminal for NOMA multi-layer transmission, the terminal is configured for the NOMA multi-layer transmission, the spread spectrum sequence group includes N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and receiving, by the network equipment, data sent by the terminal, the data including the N data layers using the spread spectrum sequence group for spectrum spreading.

In a possible implementation, determining, by the network equipment, the spread spectrum sequence group used by the terminal for the NOMA multi-layer transmission includes: selecting, by the network equipment, a spread spectrum sequence group for the NOMA multi-layer transmission from a spread spectrum sequence pool for the terminal, and the spread spectrum sequence pool includes M spread spectrum sequence groups, the spread spectrum sequences in each of the M spread spectrum sequence groups are mutually orthogonal, and M is an integer greater than 1.

In a possible implementation, the method further includes: sending, by the network equipment, configuration information of the spread spectrum sequence group selected for the terminal to the terminal.

In a possible implementation, determining, by the network equipment, the spread spectrum sequence group used by the terminal for the NOMA multi-layer transmission includes: receiving, by the network equipment, the configuration information of the spread spectrum sequence group sent by the terminal, and determining, by the network equipment, the spread spectrum sequence group used by the terminal for the NOMA multi-layer transmission according to the configuration information of the spread spectrum sequence group;

the spread spectrum sequence group is selected by the terminal from the spread spectrum sequence pool, and the spread spectrum sequence pool includes M spread spectrum sequence groups, the spread spectrum sequences in each of the M spread spectrum sequence groups are mutually orthogonal, and M is an integer greater than 1.

In a possible implementation, the spread spectrum sequence pool is preconfigured or agreed by a system.

In a possible implementation, the spread spectrum sequence pool includes 48 spread spectrum sequence groups, each of the 48 spread spectrum sequence groups includes two mutually orthogonal spread spectrum sequences, and each of the two spread spectrum sequence includes four vector elements.

In a possible implementation, the spread spectrum sequence pool is shown in a table as follows:

| Spread spectrum sequence group number | Spread spectrum sequence | | | |
|---|---|---|---|---|
| 1 | 1 | i  | −1 | −i |
|   | 1 | −i | −1 | i |
| 2 | 1 | −1 | 1  | −1 |
|   | 1 | −1 | −1 | 1 |
| 3 | 1 | −1 | −i | i |
|   | 1 | −1 | i  | −i |

-continued

| Spread spectrum sequence group number | Spread spectrum sequence | | | |
|---|---|---|---|---|
| 4 | 1 | i | -i | -1 |
|   | 1 | -i | i | -1 |
| 5 | 1 | i | -i | i |
|   | 0 | 1 | 0 | -1 |
| 6 | 1 | -1 | 1 | i |
|   | 1 | 0 | -1 | 0 |
| 7 | 1 | i | 0 | -1 |
|   | 1 | -i | -1 | 0 |
| 8 | 1 | 0 | i | -1 |
|   | 0 | 1 | -i | -1 |
| 9 | 1 | -i | i | -i |
|   | 1 | -1 | -i | 1 |
| 10 | 1 | -1 | 1 | -i |
|    | 1 | i | -1 | 1 |
| 11 | 1 | 0 | -1 | i |
|    | 0 | 1 | i | -1 |
| 12 | 1 | -i | 0 | i |
|    | 1 | i | -1 | 0 |
| 13 | 0 | 1 | -1 | 1 |
|    | 1 | i | 0 | -i |
| 14 | 1 | -1 | 1 | 0 |
|    | 1 | 0 | -1 | -i |
| 15 | 1 | 0 | -i | -1 |
|    | 1 | 0 | i | 0 |
| 16 | 1 | -i | 0 | -1 |
|    | 0 | 1 | 0 | i |
| 17 | 1 | -i | -1 | 1 |
|    | 1 | 1 | i | -1 |
| 18 | 1 | -1 | i | 1 |
|    | 1 | i | -1 | -1 |
| 19 | 1 | 0 | 0 | -1 |
|    | 1 | -1 | 0 | 1 |
| 20 | 1 | 1 | -i | -1 |
|    | 0 | 0 | 1 | i |
| 21 | 1 | -i | -1 | -1 |
|    | 0 | 1 | i | 0 |
| 22 | 1 | 1 | 0 | -1 |
|    | 1 | 0 | -1 | 1 |
| 23 | 1 | 0 | -1 | -1 |
|    | 1 | i | 1 | 0 |
| 24 | 1 | i | i | -1 |
|    | 0 | 1 | 0 | -i |
| 25 | 1 | i | -1 | i |
|    | 1 | -i | 1 | i |
| 26 | 1 | i | 1 | -i |
|    | 1 | -i | -1 | -i |
| 27 | 1 | 0 | -i | 0 |
|    | 1 | -1 | i | 0 |
| 28 | 1 | -i | -i | -1 |
|    | 1 | i | 0 | 0 |
| 29 | 1 | -i | 0 | 0 |
|    | 0 | 0 | 1 | -i |
| 30 | 0 | 1 | -i | 0 |
|    | 0 | 1 | i | 1 |
| 31 | 0 | 1 | -i | 1 |
|    | 1 | -i | 1 | 0 |
| 32 | 0 | 1 | i | -i |
|    | 1 | -1 | 0 | -i |
| 33 | 0 | 1 | -1 | -i |
|    | 1 | -i | -i | 0 |
| 34 | 1 | i | -i | 0 |
|    | 1 | 0 | i | -i |
| 35 | 1 | -1 | -i | 0 |
|    | 0 | 1 | -i | i |
| 36 | 1 | i | -i | 1 |
|    | 1 | -i | i | 1 |
| 37 | 0 | 1 | -1 | i |
|    | 1 | i | i | 0 |
| 38 | 1 | -i | i | 0 |
|    | 0 | 1 | 1 | -i |
| 39 | 1 | -1 | 1 | 1 |
|    | 1 | 1 | -1 | 1 |
| 40 | 1 | -1 | i | -1 |
|    | 1 | 1 | -1 | i |
| 41 | 1 | i | 1 | -1 |
|    | 1 | -i | i | i |
| 42 | 1 | -i | 1 | -1 |
|    | 1 | -1 | -1 | -i |
| 43 | 1 | -1 | -i | -1 |
|    | 1 | i | i | -i |
| 44 | 1 | 1 | -i | 0 |
|    | 0 | 1 | i | i |
| 45 | 0 | 1 | -i | -i |
|    | 1 | 1 | i | 0 |
| 46 | 1 | 1 | i | -i |
|    | 1 | -1 | -i | -i |
| 47 | 0 | 1 | 1 | i |
|    | 0 | 1 | -1 | 0 |
| 48 | 1 | -1 | 0 | 0 |
|    | 0 | 0 | 1 | -1. |

In one embodiment, a terminal is provided, including:

a determining device, configured to determine a spread spectrum sequence group for NOMA multi-layer transmission, the terminal is configured for the NOMA multi-layer transmission, the spread spectrum sequence group includes N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and a sending device, configured to send data including the N data layers spread by using the spread spectrum sequence group.

In one embodiment, network equipment is provided, including:

a determining device, configured to determine a spread spectrum sequence group used by a terminal for NOMA multi-layer transmission, the terminal is configured for the NOMA multi-layer transmission, the spread spectrum sequence group includes N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and a receiving device, configured to receive data sent by the terminal, the data including the N data layers using the spread spectrum sequence group for spectrum spreading.

In one embodiment, a communication apparatus is provided, including: a processor, a memory, and a transceiver, and the processor is used for reading computer instructions in the memory and executing the method in any one of the implementations in one embodiment.

In one embodiment, a communication apparatus is provided, including a processor, a memory, and a transceiver, and the processor is used for reading computer instructions in the memory and executing the method in any one of the implementations in the embodiments.

In one embodiment, a computer readable storage medium is provided, and the computer readable storage medium stores computer executable instructions, and the computer executable instructions are used for causing a computer to execute the method in any one of the implementations in the embodiments.

In one embodiment, a computer readable storage medium is provided, and the computer readable storage medium stores computer executable instructions, and the computer executable instructions are used for causing a computer to execute the method in any one of the implementations in the embodiments.

BRIEF DESCRIPTION OF THE DRAWINGS

In order to explain the embodiments of the present disclosure more clearly, the drawings used in the description of the embodiments will be briefly introduced below. The drawings in the following description are only some embodiments of the present disclosure.

FIG. 2 is a PDMA pattern matrix of 6-user single-layer transmission provided by an embodiment of the present disclosure.

FIG. 3 is a PDMA pattern matrix of 6-user double-layer transmission provided by an embodiment of the present disclosure.

FIG. 4 is a schematic flow chart of NOMA multi-layer transmission at a terminal side provided by an embodiment of the present disclosure.

FIG. 5 is a schematic flow chart of NOMA multi-layer transmission at network equipment side provided by an embodiment of the present disclosure.

DETAILED DESCRIPTION OF THE EMBODIMENTS

In the following, some terms in the embodiments of the present disclosure are explained for convenient understanding.

(1) In the embodiments of the present disclosure, the terms "network" and "system" are often used interchangeably.

(2) The term "multiple" in the embodiment of the present disclosure means two or more, and other quantifiers are similar to it.

(3) "and/or" describes the association relationship of related objects, indicating that there can be three kinds of relationships, for example, A and/or B, which can indicate that A exists alone, A and B exist at the same time, and B exists alone. The character "/" generally indicates that the former and latter related object is an "or" relationship.

In an NOMA technology, in order to distinguish signals of different UE on the same time-frequency resource, a sender uses multiple access (MA) signature to process them to assist a receiver in detection. The MA signature may be a codeword, a codebook, a spread spectrum sequence, an interleaving pattern, a mapping pattern, a preamble, and the like. Furthermore, according to whether the number of MA signatures used is one or more, it is further divided into NOMA single-layer transmission and NOMA multi-layer transmission.

Figure 1:
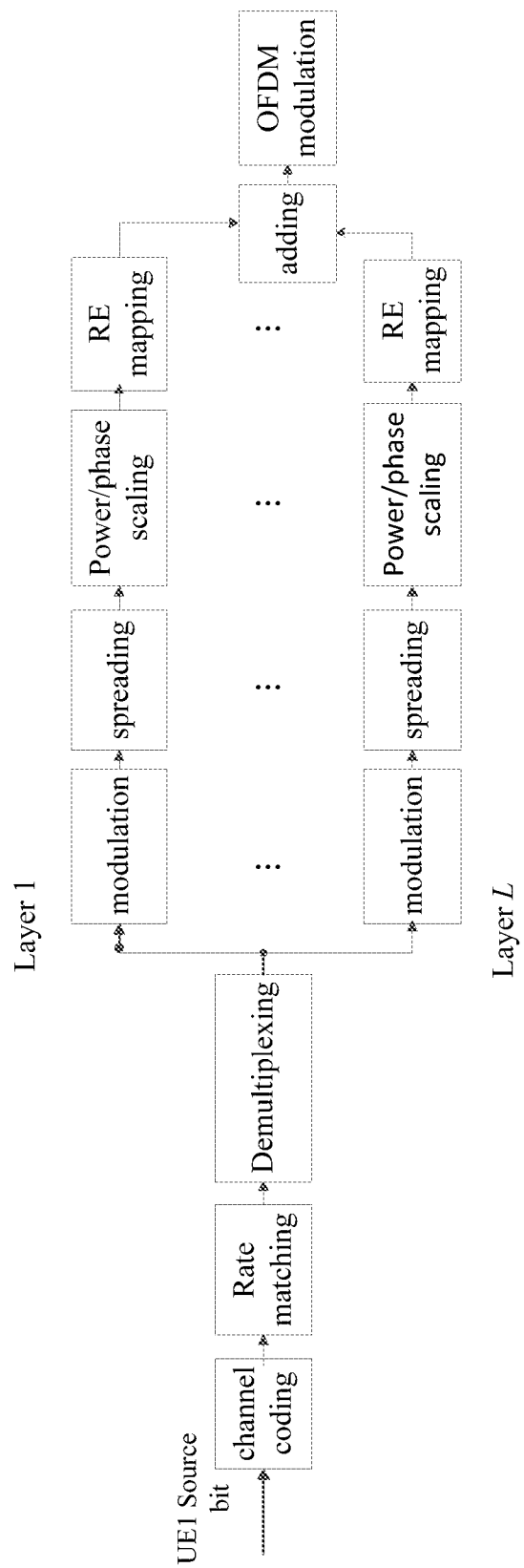
FIG. 1 is a block diagram of a sender of NOMA multi-layer transmission provided by an embodiment of the present disclosure.

FIG. 1 is a block diagram of a sender of NOMA multi-layer transmission, in which the sender demultiplexes source bits of UE1 after channel coding and rate matching, and divides them into L layers. Modulation, spreading, power/phase scaling factor processing and Resource Element (RE) Mapping (RE Mapping) are respectively performed on the sub-data stream of the $l^{th}$ layer ($1 \leq l \leq L$), and then the signals of all the L layers are added to generate an orthogonal frequency division multiplexing (OFDM) symbol, and the modulation, spread spectrum sequence and power/phase scaling factors between different layers of the same UE are not completely the same.

Accordingly, spread spectrum is processed according to a PDMA pattern matrix. PDMA pattern defines mapping rules of data to resources, and specifically defines how many resources are, which resources are mapped and how to conduct mapping. Data of multiple UE is mapped to the same set of resources through different PDMA patterns, and the number of UE supporting simultaneous transmission is greater than the number of resources, thus realizing non-orthogonal transmission and achieving the purpose of improving system performance.

A PDMA pattern may be defined by a binary vector, the length of the vector element is equal to a spreading factor, and a value of the vector element indicates a weighted coefficient value of UE data mapping to RE. A mapping weighting coefficient may be 0 or 1 or −1, or complex number i or complex number −i.

PDMA patterns of all UE multiplexing the same set of resources are arranged together to form the PDMA pattern matrix. The PDMA pattern matrix is usually a sparse matrix. The matrix shown in FIG. 2 represents a PDMA pattern matrix in which the number of multiplexed UE is 6 and the spread spectrum sequence length is 4, and each UE is single-layer transmission. Based on FIG. 2, if a data symbol sent by a user 2 is s, the data symbol sent on resources 1 to 4 after PDMA pattern matrix processing is $[s, s, -s, -s]^T$.

For NOMA multi-layer transmission, one UE occupies two or more spread spectrum sequences for spreading of each layer. FIG. 3 shows a 6-user double-layer PDMA pattern matrix, in which each UE uses two layers for transmission, and each UE occupies two spread spectrum sequences. Based on FIG. 3, it can be seen that the spreading sequences used by the two layers in some UE are not completely orthogonal, which will affect the transmission performance of the UE, especially in the case of high bit rate. At present, there is no clear solution to the problem that a spread spectrum sequence codebook used in NOMA multi-layer transmission is not completely orthogonal.

The embodiments of the present disclosure provide a NOMA multi-layer transmission solution, which can ensure that the spread spectrum sequences used by multiple layers of UE are orthogonal to each other, ensuring the data transmission performance of the UE.

Sequence orthogonality is defined as: two sequences (seq1 and seq2) are set, which are expressed as seq1={q1, q2, q3, . . . qn} and seq2={s1, s2, s3, . . . , sn} respectively. When the following conditions are met, seq1 and seq2 are completely orthogonal:

$$\text{sum}(seq1 \times \overline{seq2})/n = (q1 \times \overline{s1} + q2 \times \overline{s2} + \ldots + qn \times \overline{sn})/n = 0 \quad (1).$$

In formula (1), sum represents summation, and the upper line represents conjugation.

Embodiments of the present disclosure will be described in detail with reference to the accompanying drawings.

Referring to FIG. 4, it is a schematic flow chart of a NOMA multi-layer transmission method implemented at a terminal side provided by embodiments of the present disclosure, which can be implemented at the terminal side.

The terminal is an apparatus that provides voice and/or data connectivity to users, and may include various apparatuses with a wireless communication function such as a handheld apparatus, a vehicle-mounted apparatus, a wearable apparatus, a computing apparatus, a drone or other processing apparatuses connected to wireless modems, as well as various User Equipment (UE), Mobile Station (MS), Terminal Equipment, Transmission and Receiver Point (TRP) or Transmission Point (TP), etc.

As shown in FIG. 4, the flow may include the following steps.

S401: determining, by a terminal, a spread spectrum sequence group for NOMA multi-layer transmission; the terminal is configured for the NOMA multi-layer transmission, the spread spectrum sequence group includes N spread spectrum sequence, the N spread spectrum sequences correspond to N data layers, that is, the N spread spectrum sequences and the N data layers are in a one-to-one correspondence relation and one data layer uses one spread spectrum sequence for spreading, the N spread spectrum sequences are mutually orthogonal, N is a quantity of data layers of the NOMA multi-layer transmission, and N is an integer greater than 1.

A value of a vector element in the spread spectrum sequence is a weighting coefficient, and a length of the vector element in the spread spectrum sequence is equal to a spreading factor.

The weighting coefficient is one of 0, 1, −1, i and −i.

For example, if the terminal is configured to adopt two-layer transmission, and each layer is mapped to four REs, the spread spectrum sequence group determined by the terminal for two-layer transmission includes spread spectrum sequence 1 and spread spectrum sequence 2, the spread spectrum sequence 1 is used for layer 1 spreading and the spread spectrum sequence 2 is used for layer 2 spreading. The spread spectrum sequence 1 and the spread spectrum sequence 2 may be expressed as a vector containing four vector elements, where:

Spread spectrum sequence 1 is $[1, i, -1, -i]^T$;
Spread spectrum sequence 2 is $[1, -i, -1, i]^T$.

Spread spectrum sequence 1 and spread spectrum sequence 2 satisfy the condition described by formula (1), and are therefore orthogonal to each other. Each weighting coefficient in spread spectrum sequence 1 corresponds to an RE to which layer 1 data of the terminal is mapped, and each weighting coefficient in spread spectrum sequence 2 corresponds to an RE to which layer 2 data of the terminal is mapped.

S402: sending, by the terminal, data, the data including the N data layers spread by using the spread spectrum sequence group.

In specific implementation, the terminal demultiplexes source bits to be sent after channel coding and rate matching, and divides them into L layers (L is an integer greater than 1). Modulation, spreading, power/phase scaling factor processing and Resource Element Mapping (RE Mapping) are respectively performed on the sub-data stream of the $l^{th}$ layer ($1 \leq l \leq L$), and then the signals of all the L layers are added together, and an orthogonal frequency division multiplexing (OFDM) symbol is then generated and sent.

During spreading, each layer uses one spread spectrum sequence in the spread spectrum sequence group, and different layers use different spread spectrum sequences. Because the spread spectrum sequences in the spread spectrum sequence group are orthogonal to each other, the data after spreading of different layers of the same terminal are orthogonal to each other, and then the data transmission performance of the terminal may be improved.

In the above flow of the present disclosure, the terminal determines a spread spectrum sequence group for NOMA multi-layer transmission, the spread spectrum sequence group includes N spread spectrum sequences, the N spread spectrum sequences correspond to N data layers, and the N spread spectrum sequences are mutually orthogonal. In this way, after the terminal uses the spread spectrum sequences in the spread spectrum sequence group to carry out spectrum spreading on the N data layers, it can be ensured that the data layers, after undergoing spectrum spreading, are mutually orthogonal, and the data transmission performance of the terminal may be improved.

Based on the flow shown in FIG. 4, in a possible implementation, the spread spectrum sequence group used for NOMA multi-layer transmission is preconfigured by network equipment.

Accordingly, in S401 of FIG. 4, the terminal determines the spread spectrum sequence group for NOMA multi-layer transmission according to configuration information of the spread spectrum sequence group sent by the network equipment, the configuration information of the spread spectrum sequence group is used for indicating the spread spectrum sequence group configured for the terminal.

In one embodiment, the network equipment may select a spread spectrum sequence group for the terminal from the spread spectrum sequence pool, and send the configuration information of the selected spread spectrum sequence group to the terminal.

In one embodiment, the configuration information of the spread spectrum sequence group may include: a group identifier of the spread spectrum sequence group configured for the terminal, which is used to uniquely identify a spread spectrum sequence group. The configuration information of the spread spectrum sequence group may also include an identifier of each spread spectrum sequence in the spread spectrum sequence group, the identifier of one spread spectrum sequence is used to uniquely identify one spread spectrum sequence.

Based on the flow shown in FIG. 4, in another possible implementation, a multi-layer spread spectrum sequence is selected from a spread spectrum sequence pool. Accordingly, in S401 of FIG. 4, the terminal selects a spread spectrum sequence group for NOMA multi-layer transmission from a spread spectrum sequence pool.

In one embodiment, the method further includes: the terminal sends the configuration information of the selected spread spectrum sequence group to the network equipment, so that the network equipment may de-spread the data sent by the terminal according to the spread spectrum sequence group.

In one embodiment, the configuration information of the spread spectrum sequence group may include: a group identifier of the spread spectrum sequence group selected by the terminal, which is used to uniquely identify a spread spectrum sequence group. The configuration information of the spread spectrum sequence group may also include: an identifier of each spread spectrum sequence in the spread spectrum sequence group, the identifier of one spread spectrum sequence is used to uniquely identify one spread spectrum sequence.

Referring to FIG. 5, it is a schematic flow chart of a NOMA multi-layer transmission method implemented on a network equipment side provided by embodiments of the present disclosure, which may be implemented on the network equipment side.

The network equipment is an apparatus for connecting a terminal to a wireless network, including but not limited to an evolved Node B (eNB), a Radio Network Controller (RNC), a Node B (NB), a Base Station Controller (BSC), a Base Transceiver Station (BTS), a home base station (e.g., Home evolved Node B or Home Node B, HNB), a Base Band Unit (BBU), a Wireless Fidelity (WIFI) Access Point (AP), a Transmission and Receiver Point (TRP) or Transmission Point (TP), gNB, etc.

As shown in FIG. 5, the flow may include the following steps.

S501: determining, by network equipment, a spread spectrum sequence group used by a terminal for NOMA multi-layer transmission, the terminal is configured for the NOMA multi-layer transmission, the spread spectrum sequence group includes N spread spectrum sequences, the N spread spectrum sequences correspond to N data layers, that is, the N spread spectrum sequences and the N data layers are in a one-to-one correspondence relation and one data layer uses one spread spectrum sequence for spreading, the N spread spectrum sequences are mutually orthogonal, N is a quantity of data layers of the NOMA multi-layer transmission, and N is an integer greater than 1.

The value of the vector element in the spread spectrum sequence is a weighting coefficient, and the length of the vector element in the spread spectrum sequence is equal to the spreading factor.

The weighting coefficient is one of 0, 1, −1, i and −i.

For example, if the terminal is configured to adopt two-layer transmission, and each layer is mapped to four REs, the spread spectrum sequence group determined by the terminal for two-layer transmission includes spread spectrum sequence 1 and spread spectrum sequence 2, the spread spectrum sequence 1 is used for layer 1 spreading and the spread spectrum sequence 2 is used for layer 2 spreading. Spread spectrum sequence 1 and spread spectrum sequence 2 may be expressed as a vector containing four vector elements, where:

Spread spectrum sequence 1 is $[1, i, -1, -i]^T$;
Spread spectrum sequence 2 is $[1, -i, -1, i]^T$.

Spread spectrum sequence 1 and spread spectrum sequence 2 satisfy the condition described by formula (1), and are therefore orthogonal to each other. Each weighting coefficient in spread spectrum sequence 1 corresponds to an RE to which layer 1 data of the terminal is mapped, and each weighting coefficient in spread spectrum sequence 2 corresponds to an RE to which layer 2 data of the terminal is mapped.

S502: receiving, the network equipment, data sent by the terminal, the data including the N data layers using the spread spectrum sequence group for spreading.

In specific implementation, the network equipment splits the received OFDM symbol into L layers, and performs the processes of RE demapping, de-spreading, demodulation, decoding, etc. on the sub-data stream of the $l^{th}$ layer ($1 \leq l \leq L$), to obtain the source bits of the sub-data stream of the $l^{th}$ layer.

During de-spreading, one spread spectrum sequence in the spread spectrum sequence group is used for de-spreading for each layer, and the spread spectrum sequences used by different layers are different. Because the spread spectrum sequences in the spread spectrum sequence group are orthogonal to each other, the data after spreading in different layers of the same terminal are orthogonal to each other, and then the data transmission performance of the terminal may be improved.

Based on the flow shown in FIG. 5, in a possible implementation, the spread spectrum sequence group used for NOMA multi-layer transmission is preconfigured by network equipment. Accordingly, in S501 of FIG. 5, the network equipment selects a spread spectrum sequence group for the NOMA multi-layer transmission from a spread spectrum sequence pool for the terminal, the spread spectrum sequence pool includes M spread spectrum sequence groups, the spread spectrum sequences in each of the M spread spectrum sequence groups are mutually orthogonal, and M is an integer greater than 1.

In one embodiment, the network equipment may select a spread spectrum sequence group for the terminal from the spread spectrum sequence pool, and send the configuration information of the selected spread spectrum sequence group to the terminal.

In one embodiment, the configuration information of the spread spectrum sequence group may include: a group identifier of the spread spectrum sequence group configured for the terminal, which is used to uniquely identify a spread spectrum sequence group. The configuration information of the spread spectrum sequence group may also include: the identifier of each spread spectrum sequence in the spread spectrum sequence group, the identifier of one spread spectrum sequence is used to uniquely identify one spread spectrum sequence.

Based on the flow shown in FIG. 5, in another possible implementation, the multi-layer spread spectrum sequence is selected by the terminal from the spread spectrum sequence pool. Accordingly, in S501 of FIG. 5, the network equipment receives the configuration information of the spread spectrum sequence group sent by the terminal, and determines the spread spectrum sequence group used by the terminal for NOMA multi-layer transmission according to the configuration information of the spread spectrum sequence group; the spread spectrum sequence group is selected by the terminal from a spread spectrum sequence pool, and the spread spectrum sequence pool includes M spread spectrum sequence groups, the spread spectrum sequences in each of the M spread spectrum sequence groups are mutually orthogonal, and M is an integer greater than 1.

In one embodiment, the configuration information of the spread spectrum sequence group may include: a group identifier of the spread spectrum sequence group, which is used to uniquely identify a spread spectrum sequence group. The configuration information of the spread spectrum sequence group may also include the identifier of each spread spectrum sequence in the spread spectrum sequence group, and the identifier of one spread spectrum sequence is used to uniquely identify one spread spectrum sequence.

In the embodiment of the present disclosure, the spread spectrum sequence pool is preconfigured or agreed by a system.

The spread spectrum sequence pool includes M spread spectrum sequence groups, and the spread spectrum sequences in each of the M spread spectrum sequence groups are mutually orthogonal. M is an integer greater than 1.

Considering that the value of a vector element (i.e., weighting coefficient) in a spread spectrum sequence may be one of 0, 1, −1, i and −i, when a terminal supports two layers of transmission at most, a large number of spread spectrum sequence groups may be mutually orthogonal. Each of these spread spectrum sequence groups may be used for a simulation test, and some spread spectrum sequence groups with better transmission performance may be selected, or spread spectrum sequence groups meeting preset conditions may be selected, thus forming a spread spectrum sequence pool. The number of spread spectrum sequence groups contained in the spread spectrum sequence pool is greater than or equal to the maximum user reuse number supported by the system.

For example, if a terminal supports at most two layers of transmission, and the data of each layer are mapped to four REs, the spread spectrum sequence pool includes 48 spread spectrum sequence groups, each of the 48 spread spectrum sequence groups includes two mutually orthogonal spread spectrum sequences, and each of the two spread spectrum sequences includes four vector elements. Table 1 shows this spread spectrum sequence pool as an example.

TABLE 1

Spread Spectrum Sequence Pool

| Spread spectrum sequence group number m for two-layer transmission | Spread spectrum sequence g(m) | | | |
|---|---|---|---|---|
| 1 | 1 | i | −1 | −i |
|   | 1 | −i | −1 | i |
| 2 | 1 | −1 | 1 | −1 |
|   | 1 | −1 | −1 | 1 |
| 3 | 1 | −1 | −i | i |
|   | 1 | −1 | i | −i |
| 4 | 1 | i | −i | −1 |
|   | 1 | −i | i | −1 |
| 5 | 1 | i | −i | i |
|   | 0 | 1 | 0 | −1 |
| 6 | 1 | −1 | 1 | i |
|   | 1 | 0 | −1 | 0 |
| 7 | 1 | i | 0 | −1 |
|   | 1 | −i | −1 | 0 |
| 8 | 1 | 0 | i | −1 |
|   | 0 | 1 | −i | −1 |
| 9 | 1 | −i | i | −i |
|   | 1 | −1 | −i | 1 |
| 10 | 1 | −1 | 1 | −i |
|    | 1 | i | −1 | 1 |
| 11 | 1 | 0 | −1 | i |
|    | 0 | 1 | i | −1 |
| 12 | 1 | −i | 0 | i |
|    | 1 | i | −1 | 0 |
| 13 | 0 | 1 | −1 | 1 |
|    | 1 | i | 0 | −i |
| 14 | 1 | −1 | 1 | 0 |
|    | 1 | 0 | −1 | −i |
| 15 | 1 | 0 | −i | −1 |
|    | 1 | 0 | i | 0 |
| 16 | 1 | −i | 0 | −1 |
|    | 0 | 1 | 0 | i |
| 17 | 1 | −i | −1 | 1 |
|    | 1 | 1 | i | −1 |
| 18 | 1 | −1 | i | 1 |
|    | 1 | i | −1 | −1 |
| 19 | 1 | 0 | 0 | −1 |
|    | 1 | −1 | 0 | 1 |
| 20 | 1 | 1 | −i | −1 |
|    | 0 | 0 | 1 | i |
| 21 | 1 | −i | −1 | −1 |
|    | 0 | 1 | i | 0 |
| 22 | 1 | 1 | 0 | −1 |
|    | 1 | 0 | −1 | 1 |
| 23 | 1 | 0 | −1 | −1 |
|    | 1 | i | 1 | 0 |
| 24 | 1 | i | i | −1 |
|    | 0 | 1 | 0 | −i |
| 25 | 1 | i | −1 | i |
|    | 1 | −1 | 1 | 1 |
| 26 | 1 | i | 1 | −i |
|    | 1 | −i | −1 | −i |
| 27 | 1 | 0 | −i | 0 |
|    | 1 | −1 | i | 0 |
| 28 | 1 | −i | −i | −1 |
|    | 1 | i | 0 | 0 |
| 29 | 1 | −i | 0 | 0 |
|    | 0 | 0 | 1 | −i |
| 30 | 0 | 1 | −i | 0 |
|    | 0 | 1 | i | 1 |
| 31 | 0 | 1 | −i | 1 |
|    | 1 | −i | 1 | 0 |
| 32 | 0 | 1 | i | −i |
|    | 1 | −1 | 0 | −i |
| 33 | 0 | 1 | −1 | −i |
|    | 1 | −i | −i | 0 |
| 34 | 1 | i | −i | 0 |
|    | 1 | 0 | i | −i |
| 35 | 1 | −1 | −i | 0 |
|    | 0 | 1 | −i | i |
| 36 | 1 | i | −i | 1 |
|    | 1 | −i | i | 1 |
| 37 | 0 | 1 | −1 | i |
|    | 1 | i | i | 0 |
| 38 | 1 | −i | i | 0 |
|    | 0 | 1 | 1 | −i |
| 39 | 1 | −1 | 1 | 1 |
|    | 1 | 1 | −1 | 1 |
| 40 | 1 | −1 | i | −1 |
|    | 1 | 1 | −1 | i |
| 41 | 1 | i | 1 | −1 |
|    | 1 | −i | i | i |
| 42 | 1 | −i | 1 | −1 |
|    | 1 | −1 | −1 | −i |
| 43 | 1 | −1 | −i | −1 |
|    | 1 | i | i | −i |
| 44 | 1 | 1 | −i | 0 |
|    | 0 | 1 | i | i |
| 45 | 0 | 1 | −i | −i |
|    | 1 | 1 | i | 0 |
| 46 | 1 | 1 | i | −i |
|    | 1 | −1 | −i | −i |
| 47 | 0 | 1 | 1 | i |
|    | 0 | 1 | −1 | 0 |
| 48 | 1 | −1 | 0 | 0 |
|    | 0 | 0 | 1 | −1 |

As shown in Table 1, the spread spectrum sequence group 1 includes two spread spectrum sequences, which are respectively represented as $[1, i, -1, -i]^T$ and $[1, -i, -1, i]^T$. The spread spectrum sequences included in other spread spectrum sequence groups are shown in the table and will not be explained one by one.

In order to understand the above embodiments of the present disclosure more clearly, the embodiments of the present disclosure will be described in detail with several specific examples below.

Example 1

There are four UE configured for NOMA transmission in a network, namely UE1, UE2, UE3 and UE4. When all UE are configured for two-layer transmission, these four UE select spread spectrum sequence groups from a spread spectrum sequence pool for two-layer transmission shown in Table 1. UE1 selects the spread spectrum sequence group No. 1, UE2 selects the spread spectrum sequence group No. 3, UE3 selects the spread spectrum sequence group No. 4, and UE4 selects the spread spectrum sequence group No. 39, so a double-layer spread spectrum sequence matrix used by these four UE is shown in Table 2.

TABLE 2

4-user double-layer spread spectrum sequence matrix of Example 1.

| | Spread spectrum sequence group number | | | | | | | |
|---|---|---|---|---|---|---|---|---|
| | No. 1 | | No. 3 | | No. 4 | | No. 39 | |
| Resource 1 | 1 | 1 | 1 | 1 | 1 | 1 | 1 | 1 |
| Resource 2 | i | −i | −1 | −1 | i | −i | −1 | 1 |
| Resource 3 | −1 | −1 | −i | i | −i | i | 1 | −1 |
| Resource 4 | −i | i | i | −i | −1 | −1 | 1 | 1 |
| User number | UE1 | | UE2 | | UE3 | | UE4 | |

In Table 2, a spread spectrum sequence used by a sub-data stream corresponding to layer 1 of UE1 is $[1, i, -1, -i]^T$, and a spread spectrum sequence used by a sub-data stream corresponding to layer 2 of UE1 is $[1, -i, -1, i]^T$. The spread spectrum sequence groups used by other UE are shown in Table 2, and will not be described in detail here.

Example 2

There are 6 UE configured for NOMA transmission in a network, namely UE1, UE2, UE3, UE4, UE5 and UE6. When all UE are configured for two-layer transmission, the six UE select spread spectrum sequence groups from the spread spectrum sequence pool described in Table 1. UE1 selects the spread spectrum sequence group No. 34, UE2 selects the spread spectrum sequence group No. 1, UE3 selects the spread spectrum sequence group No. 16, UE4 selects the spread spectrum sequence group No. 25, UE5 selects the spread spectrum sequence group No. 26 and UE6 selects the spread spectrum sequence group No. 33, so a two-layer spread spectrum sequence matrix used by these six UE is shown in Table 3.

TABLE 3

6-user double-layer spread spectrum sequence matrix of Example 2.

| | Serial pair number | | | | | |
|---|---|---|---|---|---|---|
| | No. 34 | No. 1 | No. 16 | No. 25 | No. 26 | No. 33 |
| Resource 1 | 1  1 | 1  1 | 1  0 | 1  1 | 1  1 | 0  1 |
| Resource 2 | i  0 | i  −i | −i  1 | i  −i | i  −i | 1  −i |
| Resource 3 | −i  i | −1  −1 | 0  0 | −1  1 | 1  −1 | −1  −i |
| Resource 4 | 0  −i | −i  i | −1  i | i  i | −i  −i | −i  0 |
| User number | UE1 | UE2 | UE3 | UE4 | UE5 | UE6 |

In Table 3, a spread spectrum sequence used by a sub-data stream corresponding to layer 1 of UE1 is $[1, i, -i, 0]^T$, and a spread spectrum sequence used by a sub-data stream corresponding to layer 2 of UE1 is $[1, 0, i, -i]^T$. The spread spectrum sequence groups used by other UE are shown in Table 3, and will not be described in detail here.

Example 3

There are 8 UE configured for NOMA transmission in a current network, namely UE1, UE2, UE3, UE4, UE5, UE6, UE7 and UE8. When all UE are configured for two-layer transmission, these eight UE select spread spectrum sequence groups from a spread spectrum sequence pool shown in Table 1. Among them, UE1 chooses spread spectrum sequence group No. 2, UE2 chooses spread spectrum sequence group No. 7, UE3 chooses spread spectrum sequence group No. 8, UE4 chooses spread spectrum sequence group No. 11, UE5 chooses spread spectrum sequence group No. 12, UE6 chooses spread spectrum sequence group No. 31, UE7 chooses spread spectrum sequence group No. 36 and UE8 chooses spread spectrum sequence group No. 46, so a two-layer spread spectrum sequence matrix used by these eight UE is shown in Table 4.

TABLE 4

8-user double-layer spread spectrum sequence matrix of Example 3.

| | Serial pair number | | | | | | | |
|---|---|---|---|---|---|---|---|---|
| | No. 2 | No. 7 | No. 8 | No. 11 | No. 12 | No. 31 | No. 36 | No. 46 |
| Resource 1 | 1  1 | 1  1 | 1  0 | 1  0 | 1  1 | 0  1 | 1  1 | 1  1 |
| Resource 2 | −1  −1 | i  −i | 0  1 | 0  1 | −i  i | 1  −i | i  −i | 1  −1 |
| Resource 3 | 1  −1 | 0  −1 | i  −i | −1  i | 0  −1 | −i  1 | −i  i | i  −i |
| Resource 4 | −1  1 | −1  0 | −1  −1 | i  −1 | i  0 | 1  0 | 1  1 | −i  −i |
| User number | UE1 | UE2 | UE3 | UE4 | UE5 | UE6 | UE7 | UE8 |

In Table 4, a spread spectrum sequence used by a sub-data stream corresponding to layer 1 of UE1 is $[1, -1, 1, -1]^T$, and a spread spectrum sequence used by a sub-data stream corresponding to layer 2 of UE1 is $[1, -1, -1, 1]^T$. The spread spectrum sequence groups used by other UE are shown in Table 4, and will not be described in detail here.

Example 4

There are 10 UE configured for NOMA transmission in a network, namely UE1, UE2, UE3, UE4, UE5, UE6, UE7, UE8, UE9 and UE10. When all UE are configured for two-layer transmission, these 10 UE select spread spectrum sequence groups from a spread spectrum sequence pool shown in Table 1. UE1 selects spread spectrum sequence group No. 39, UE2 selects spread spectrum sequence group No. 1, UE3 selects spread spectrum sequence group No. 2, UE4 selects spread spectrum sequence group No. 3, UE5 selects spread spectrum sequence group No. 4, UE6 selects spread spectrum sequence group No. 23, UE7 selects spread spectrum sequence group No. 24, UE8 selects spread spectrum sequence group No. 25 and UE9 selects spread spectrum sequence group No. 29 and UE10 chooses spread spectrum sequence group No. 36, so a two-layer spread spectrum sequence matrix used by these ten UE is shown in Table 5.

TABLE 5

10-user double-layer spread spectrum sequence matrix of Example 4.

| | Serial pair number | | | | | | | | | |
|---|---|---|---|---|---|---|---|---|---|---|
| | No. 39 | No. 1 | No. 2 | No. 3 | No. 4 | No. 23 | No. 24 | No. 25 | No. 29 | No. 36 |
| Resource 1 | 1 1 | 1 1 | 1 1 | 1 1 | 1 1 | 1 0 | 1 1 | 1 0 | 1 1 | |
| Resource 2 | -1 1 | i -i | -1 -1 | -1 -1 | i -i | 0 i | i 1 | i -i | -i 0 | i -i |
| Resource 3 | 1 -1 | -1 -1 | 1 -1 | -i i | -i i | -1 1 | i 0 | -1 1 | 0 1 | -i i |
| Resource 4 | 1 1 | -i i | -1 1 | i -i | -1 -1 | -1 0 | -1 -i | i i | 0 -i | 1 1 |
| User number | UE1 | UE2 | UE3 | UE4 | UE5 | UE6 | UE7 | UE8 | UE9 | UE10 |

In Table 5, a spread spectrum sequence used by a sub-data stream corresponding to layer 1 of UE1 is $[1, -1, 1, 1]^T$, and a spread spectrum sequence used by a sub-data stream corresponding to layer 2 of UE1 is $[1, 1, -1, 1]^T$. The spread spectrum sequence groups used by other UE are shown in Table 5, and will not be described in detail here.

Example 5

There are 12 UE configured for NOMA transmission in a network, namely UE1, UE2, UE3, UE4, UE5, UE6, UE7, UE8, UE9, UE10, UE11 and UE12. When all UE are configured for two-layer transmission, these 12 UE select spread spectrum sequence groups from a spread spectrum sequence pool shown in Table 1. UE1 chooses spread spectrum sequence group No. 1, UE2 chooses spectrum sequence group No. 2, UE3 chooses spread spectrum sequence group No. 3, UE4 chooses spread spectrum sequence group No. 4, UE5 chooses spread spectrum sequence group No. 23, UE6 chooses spread spectrum sequence group No. 24, UE7 chooses spread spectrum sequence group No. 25, UE8 chooses spread spectrum sequence group No. 29, UE9 chooses spread spectrum sequence group No. 36, UE10 chooses spread spectrum sequence group No. 39, UE11 chooses spread spectrum sequence group No. 44, and UE12 chooses spread spectrum sequence group No. 48, so a two-layer spread spectrum sequence matrices used by these 12 UE are shown in Table 6-1 and Table 6-2.

TABLE 6-1

12-user double-layer spread spectrum sequence matrix of Example 5.

| | Serial pair number | | | | | |
|---|---|---|---|---|---|---|
| | No. 1 | No. 2 | No. 3 | No. 4 | No. 23 | No. 24 |
| Resource 1 | 1 1 | 1 1 | 1 1 | 1 1 | 1 1 | 1 0 |
| Resource 2 | i -i | -1 -1 | -1 -1 | i -i | 0 i | i 1 |
| Resource 3 | -1 -1 | 1 -1 | -i i | -i i | -1 1 | i 0 |
| Resource 4 | -i i | -1 1 | i -i | -1 -1 | -1 0 | -1 -i |
| User number | UE1 | UE2 | UE3 | UE4 | UE5 | UE6 |

TABLE 6-2

12-user double-layer spread spectrum sequence matrix of Example 5.

| | Serial pair number | | | | | |
|---|---|---|---|---|---|---|
| | No. 25 | No. 29 | No. 36 | No. 39 | No. 44 | No. 48 |
| Resource 1 | 1 1 | 1 0 | 1 1 | 1 1 | 1 0 | 1 0 |
| Resource 2 | i -i | -i 0 | i -i | -1 1 | 1 1 | -1 0 |
| Resource 3 | -1 1 | 0 1 | -i i | 1 -1 | -i i | 0 1 |
| Resource 4 | i i | 0 -i | 1 1 | 1 1 | 1 0 | 0 -1 |
| User number | UE7 | UE8 | UE9 | UE10 | UE11 | UE12 |

In Table 6-1 and Table 6-2 of the 12-user double-layer spread spectrum sequence matrix of Example 5, a spread spectrum sequence used by a sub-data stream corresponding to layer 1 of UE1 is $[1, i, -1, -i]^T$, and a spread spectrum sequence used by a sub-data stream corresponding to layer 2 of UE1 is $[1, -i, -1, i]^T$. The spread spectrum sequence groups used by other UE are shown in Table 6, and will not be described in detail here.

Based on an embodiment of the present disclosure also provides a terminal. This terminal can realize the functions of the terminal side in the foregoing embodiments.

Figure 6:
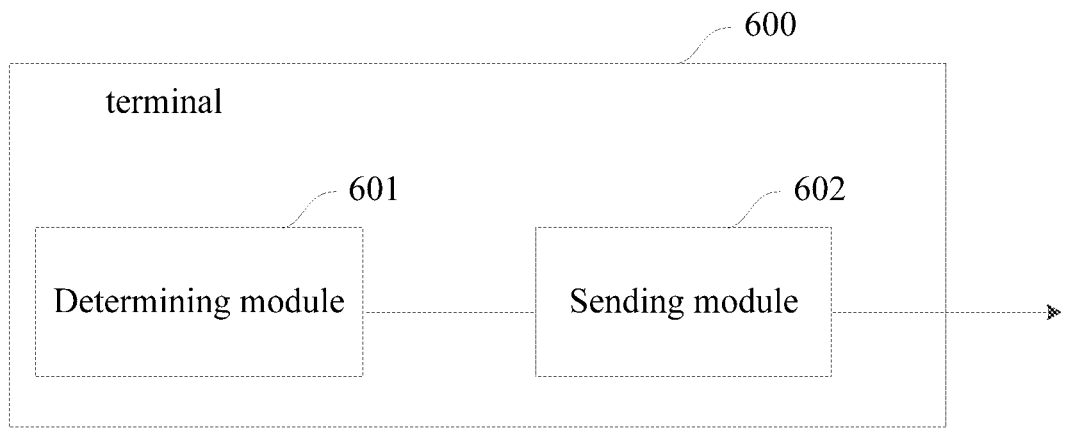
FIG. 6 is a schematic structural diagram of a terminal provided by an embodiment of the present disclosure.

Referring to FIG. 6, which is a schematic structural diagram of a terminal provided by an embodiment of the present disclosure, the terminal 600 may include: a determining device 601 and a sending device 602.

A determining device 601 is configured to determine a spread spectrum sequence group for NOMA multi-layer transmission, the terminal is configured for the NOMA multi-layer transmission, the spread spectrum sequence group includes N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and a sending device 602 is configured to send data including the N data layers spread by using the spread spectrum sequence group.

In one embodiment, the determining device 601 may be further configured to: determine a spread spectrum sequence group for the NOMA multi-layer transmission according to configuration information of the spread spectrum sequence group sent by network equipment, the configuration information of the spread spectrum sequence group is used for indicating the spread spectrum sequence group configured for the terminal.

In one embodiment, the determining device 601 may be further configured to: select the spread spectrum sequence group for the NOMA multi-layer transmission from a spread spectrum sequence pool, and the spread spectrum sequence pool includes M spread spectrum sequence groups, the spread spectrum sequences in each of the M spread spectrum sequence groups are mutually orthogonal, and M is an integer greater than 1.

In one embodiment, the determining device 601 is further configured to: send the configuration information of the selected spread spectrum sequence group to the network equipment by the sending device 602.

In one embodiment, the spread spectrum sequence pool is preconfigured or agreed by a system.

In one embodiment, the spread spectrum sequence pool includes 48 spread spectrum sequence groups, each spread spectrum sequence group includes two mutually orthogonal spread spectrum sequences, and each spread spectrum sequence includes four vector elements. An example of the spread spectrum sequence pool can be shown in Table 1 above.

Based on the embodiment of the present disclosure also provides network equipment. The network equipment can realize the functions of the network equipment side in the foregoing embodiments. The network equipment may be a base station.

Figure 7:
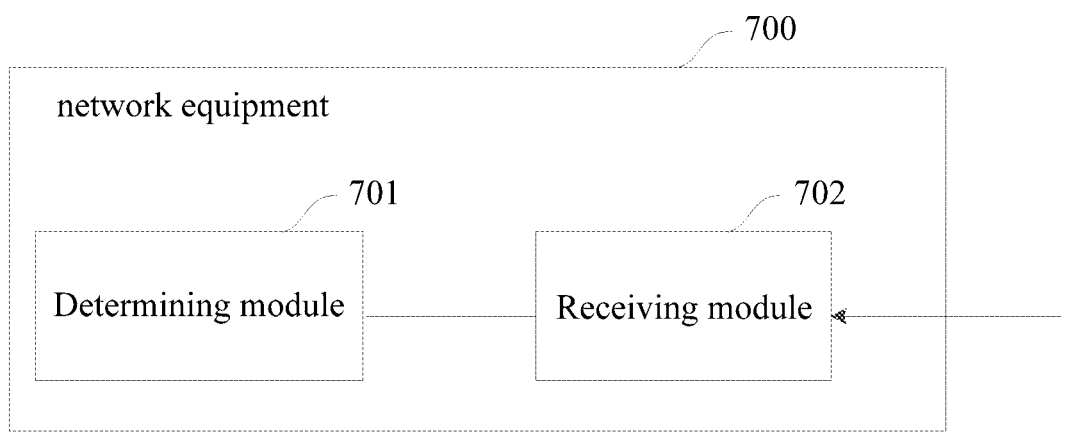
FIG. 7 is a schematic structural diagram of network equipment provided by an embodiment of the present disclosure.

Referring to FIG. 7, it is a schematic structural diagram of network equipment provided by an embodiment of the present disclosure. The network equipment 700 may include: a determining device 701, a receiving device 702, and may further include a sending device (not shown in the figure).

A determining device 701 is configured to determine a spread spectrum sequence group used by a terminal for NOMA multi-layer transmission, the terminal is configured for the NOMA multi-layer transmission, the spread spectrum sequence group includes N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and a receiving device 702 is configured to receive data sent by the terminal, the data including the N data layers using the spread spectrum sequence group for spreading.

In one embodiment, the determining device 701 is further configured to: select a spread spectrum sequence group for the NOMA multi-layer transmission from a spread spectrum sequence pool for the terminal, and the spread spectrum sequence pool includes M spread spectrum sequence groups, the spread spectrum sequences in each of the M spread spectrum sequence groups are mutually orthogonal, and M is an integer greater than 1.

In one embodiment, the determining device 701 is further configured to: send configuration information of the spread spectrum sequence group selected for the terminal to the terminal by the sending device.

In one embodiment, the determining device 701 is further configured to: receive the configuration information of the spread spectrum sequence group sent by the terminal by the receiving device 702, and determine the spread spectrum sequence group used by the terminal for the NOMA multi-layer transmission according to the configuration information of the spread spectrum sequence group; the spread spectrum sequence group is selected by the terminal from a spread spectrum sequence pool, and the spread spectrum sequence pool includes M spread spectrum sequence groups, the spread spectrum sequences in each of the M spread spectrum sequence groups are mutually orthogonal, and M is an integer greater than 1.

In one embodiment, the spread spectrum sequence pool is preconfigured or agreed by a system.

In one embodiment, the spread spectrum sequence pool includes 48 spread spectrum sequence groups, each spread spectrum sequence group includes two mutually orthogonal spread spectrum sequences, and each of the 48 spread spectrum sequences includes four vector elements. An example of the spread spectrum sequence pool may be shown in Table 1 above.

Based on the embodiments of the present disclosure also provide a communication apparatus, which may be a terminal and can realize the functions realized by a terminal side in the embodiment of the present disclosure.

Figure 8:
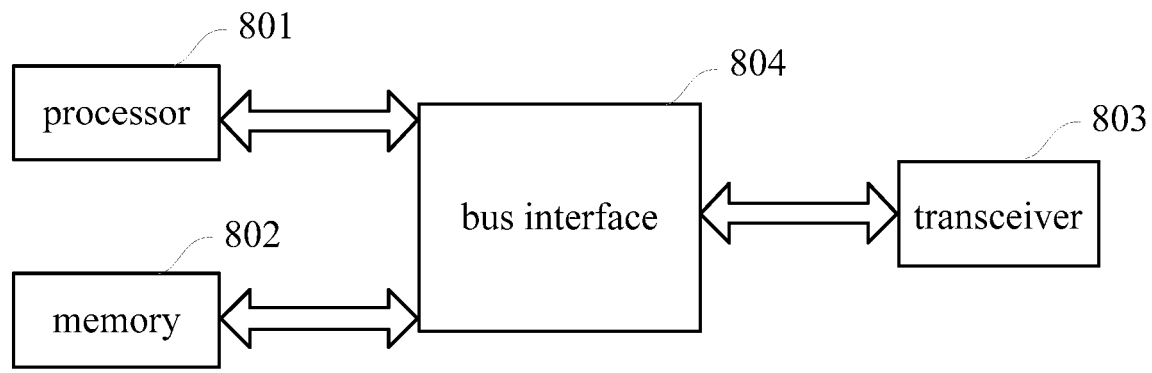
FIG. 8 is a schematic structural diagram of a communication apparatus provided by an embodiment of the present disclosure.

Referring to FIG. 8, it is a schematic structural diagram of a communication apparatus provided by an embodiment of the present disclosure. As shown in the figure, the communication apparatus may include: a processor 801, a memory 802, a transceiver 803 and a bus interface 804.

The processor 801 is responsible for managing a bus architecture and general processing, and the memory 802 may store data used by the processor 801 when performing operations. The transceiver 803 is configured to receive and transmit data under the control of the processor 801.

The bus architecture may include any number of interconnected buses and bridges. Specifically, one or more processors represented by the processor 801 and various circuits of memories represented by the memory 802 are linked together. The bus architecture can also link various other circuits, such as peripheral apparatuses, voltage regulators, power management circuits, etc., which are well known in the art, so they will not be further described here. The bus interface provides an interface. The processor 801 is responsible for managing the bus architecture and general processing, and the memory 802 may store data used by the processor 801 when performing operations.

The flow disclosed in the embodiment of the present disclosure may be applied to or implemented by the processor 801. In the implementation process, each step of the signal processing flow may be completed by an integrated logic circuit of hardware in the processor 801 or instructions in the form of software. The processor 801 may be a general-purpose processor, a digital signal processor, an application specific integrated circuit, a field programmable gate array or other programmable logic devices, a discrete gate or transistor logic devices, and a discrete hardware gate component, and can implement or execute the methods, steps and logic block diagrams disclosed in the embodiments of the present disclosure. The general-purpose processor may be a microprocessor or any conventional processor. The steps of the method disclosed in the embodiment of the present disclosure may be executed by directly embodied hardware processor, or by hardware and software device combination in the processor. The software device may be located in mature storage media in the art such as random access memory, flash memory, read-only memory, programmable read-only memory, electrically erasable programmable memory, register, etc. The storage medium is in the memory 802, and the processor 801 reads the information in the memory 802 and completes the steps of the signal processing flow in combination with its hardware.

Accordingly, the processor 801 is configured to read the computer instructions in the memory 802 and execute functions implemented by the terminal side in the flow shown in FIG. 4.

Based on the embodiments of the present disclosure also provide a communication apparatus, which may be network equipment, such as a base station, and can realize functions realized by the network equipment side in the embodiment of the present disclosure.

Figure 9:
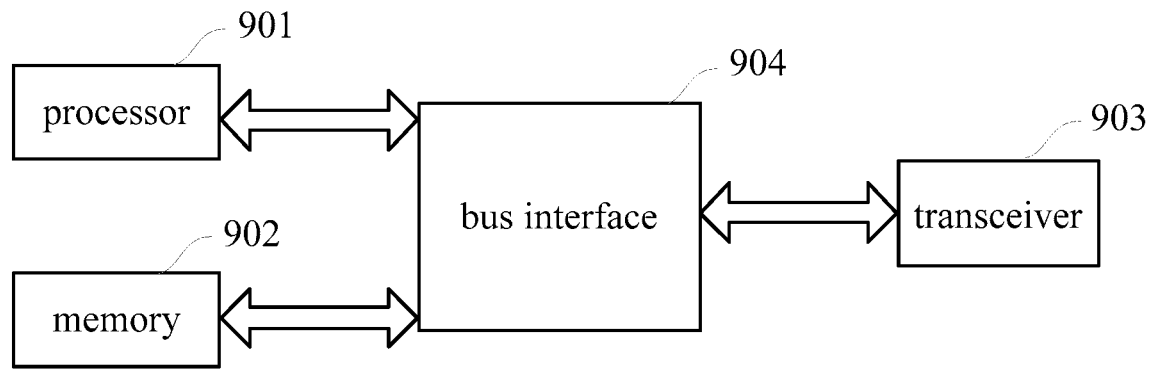
FIG. 9 is a schematic structural diagram of a communication apparatus provided by an embodiment of the present disclosure.

Referring to FIG. 9, it is a schematic structural diagram of a communication apparatus provided by an embodiment of the present disclosure. As shown in the figure, the communication apparatus may include: a processor 901, a memory 902, a transceiver 903 and a bus interface 904.

The processor 901 is responsible for managing the bus architecture and general processing, and the memory 902 may store data used by the processor 901 when performing operations. The transceiver 903 is configured to receive and transmit data under the control of the processor 901.

The bus architecture may include any number of interconnected buses and bridges. Accordingly, one or more processors represented by the processor 901 and various circuits of the memories represented by the memory 902 are linked together. The bus architecture can also link various other circuits, such as peripheral apparatuses, voltage regulators, power management circuits, etc., which are well known in the art, so they will not be further described here. The bus interface provides an interface. The processor 901 is responsible for managing the bus architecture and general processing, and the memory 902 may store data used by the processor 901 when performing operations.

The flow disclosed in the embodiment of the present disclosure may be applied to or implemented by the processor 901. In the implementation process, each step of the signal processing flow may be completed by an integrated logic circuit of hardware or instructions in the form of software in the processor 901. The processor 901 may be a general-purpose processor, a digital signal processor, an application specific integrated circuit, a field programmable gate array or other programmable logic devices, a discrete gate or transistor logic device, and a discrete hardware component, and may implement or execute the methods, steps and logic block diagrams disclosed in the embodiments of the present disclosure. The general-purpose processor may be a microprocessor or any conventional processor. The steps of the method disclosed in the embodiment of the present disclosure may be executed by directly-embodied hardware processor, or by hardware and software device combination in the processor. The software device may be located in mature storage media in the art such as a random access memory, a flash memory, a read-only memory, a programmable read-only memory, an electrically erasable programmable memory, a register, etc. The storage medium is located in the memory 902, and the processor 901 reads the information in the memory 902 and completes the steps of the signal processing flow in combination with its hardware.

Accordingly, the processor 901 is configured to read the computer instructions in the memory 902 and execute functions implemented by the network equipment side in the flow shown in FIG. 5.

Based on the embodiments of the present disclosure also provide a computer readable storage medium, and the computer readable storage medium stores computer executable instructions for causing a computer to execute the flow executed by the terminal in FIG. 4.

Based on the embodiments of the present disclosure also provide a computer readable storage medium, and the computer readable storage medium stores computer executable instructions for causing a computer to execute the flow executed by the network equipment in FIG. 5.

The present disclosure is described with reference to the flow chart and/or the block diagram of methods, apparatuses (systems), and computer program products according to embodiments of the present disclosure. It should be understood that each flow and/or block in the flow chart and/or block diagram, and combinations of flows and/or blocks in the flow chart and/or block diagram may be implemented by the computer program instructions. These computer program instructions may be provided to a processor of a general purpose computer, a special purpose computer, an embedded processor or other programmable data processing apparatus to produce a machine, and the instructions which are executed by the processor of the computer or other programmable data processing apparatuses produce an apparatus for implementing the functions specified in one or more flows in the flow chart and/or one or more blocks in the block diagram.

These computer program instructions may also be stored in a computer readable memory that can direct a computer or other programmable data processing apparatuses to operate in a specific manner, and the instructions stored in the computer readable memory produce a product including instruction apparatuses that implement the functions specified in one or more flows of the flow chart and/or one or more blocks of the block diagram.

These computer program instructions may also be loaded onto a computer or other programmable data processing apparatuses, and a series of operational steps are performed on the computer or other programmable apparatuses to produce computer-implemented processing, the instructions which are executed on the computer or other programmable apparatuses provide steps for implementing the functions specified in one or more flows in the flow chart and/or one or more blocks in the block diagram.

What is claimed is:

1. A non-orthogonal multiple access (NOMA) multi-layer transmission method, comprising:
    determining, by a terminal, a spread spectrum sequence group for NOMA multi-layer transmission, wherein the terminal is configured for the NOMA multi-layer transmission, the spread spectrum sequence group comprises N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and sending, by the terminal, data; wherein the data comprises the N data layers spread by using the spread spectrum sequence group, and during spreading the N data layers, different data layers use different spread spectrum sequences;

wherein said determining, by the terminal, the spread spectrum sequence group for the NOMA multi-layer transmission comprises:

selecting, by the terminal, the spread spectrum sequence group for the NOMA multi-layer transmission from a spread spectrum sequence pool;

wherein the spread spectrum sequence pool comprises M spread spectrum sequence groups, spread spectrum sequences in each of the M spread spectrum sequence groups are mutually orthogonal, and M is an integer greater than 1; wherein the spread spectrum sequence pool is preconfigured or agreed by a system;

wherein the spread spectrum sequence pool comprises 48 spread spectrum sequence groups, each of the 48 spread spectrum sequence groups comprises two mutually orthogonal spread spectrum sequences, and each of the two spread spectrum sequences comprises four vector elements; and wherein the spread spectrum sequence pool is shown in a table as follows:

| Spread spectrum sequence group number | Spread spectrum sequence | | | |
|---|---|---|---|---|
| 1 | 1 | $i$ | $-1$ | $-i$ |
|   | 1 | $-i$ | $-1$ | $i$ |
| 2 | 1 | $-1$ | 1 | $-1$ |
|   | 1 | $-1$ | $-1$ | 1 |
| 3 | 1 | $-1$ | $-i$ | $i$ |
|   | 1 | $-1$ | $i$ | $-i$ |
| 4 | 1 | $i$ | $-i$ | $-1$ |
|   | 1 | $-i$ | $i$ | $-1$ |
| 5 | 1 | $i$ | $-i$ | $i$ |
|   | 0 | 1 | 0 | $-1$ |
| 6 | 1 | $-1$ | 1 | $i$ |
|   | 1 | 0 | $-1$ | 0 |
| 7 | 1 | $i$ | 0 | $-1$ |
|   | 1 | $-i$ | $-1$ | 0 |
| 8 | 1 | 0 | $i$ | $-1$ |
|   | 0 | 1 | $-i$ | $-1$ |
| 9 | 1 | $-i$ | $i$ | $-i$ |
|   | 1 | $-1$ | $-i$ | 1 |
| 10 | 1 | $-1$ | 1 | $-i$ |
|    | 1 | $i$ | $-1$ | 1 |
| 11 | 1 | 0 | $-1$ | $i$ |
|    | 0 | 1 | $i$ | $-1$ |
| 12 | 1 | $-i$ | 0 | $i$ |
|    | 1 | $i$ | $-1$ | 0 |
| 13 | 0 | 1 | $-1$ | 1 |
|    | 1 | $i$ | 0 | $-i$ |
| 14 | 1 | $-1$ | 1 | 0 |
|    | 1 | 0 | $-1$ | $-i$ |
| 15 | 1 | 0 | $-i$ | $-1$ |
|    | 1 | 0 | $i$ | 0 |
| 16 | 1 | $-i$ | 0 | $-1$ |
|    | 0 | 1 | 0 | $i$ |
| 17 | 1 | $-i$ | $-1$ | 1 |
|    | 1 | 1 | $i$ | $-1$ |
| 18 | 1 | $-1$ | $i$ | 1 |
|    | 1 | $i$ | $-1$ | $-1$ |
| 19 | 1 | 0 | 0 | $-1$ |
|    | 1 | $-1$ | 0 | 1 |
| 20 | 1 | 1 | $-i$ | $-1$ |
|    | 0 | 0 | 1 | $i$ |
| 21 | 1 | $-i$ | $-1$ | $-1$ |
|    | 0 | 1 | $i$ | 0 |
| 22 | 1 | 1 | 0 | $-1$ |
|    | 1 | 0 | $-1$ | 1 |
| 23 | 1 | 0 | $-1$ | $-1$ |
|    | 1 | $i$ | 1 | 0 |
| 24 | 1 | $i$ | $i$ | $-1$ |
|    | 0 | 1 | 0 | $-i$ |
| 25 | 1 | $i$ | $-1$ | $i$ |
|    | 1 | $-i$ | 1 | $i$ |
| 26 | 1 | $i$ | 1 | $-i$ |
|    | 1 | $-i$ | $-1$ | $-i$ |
| 27 | 1 | 0 | $-i$ | 0 |
|    | 1 | $-1$ | $i$ | 0 |
| 28 | 1 | $-i$ | $-i$ | $-1$ |
|    | 1 | $i$ | 0 | 0 |
| 29 | 1 | $-i$ | 0 | 0 |
|    | 0 | 0 | 1 | $-i$ |
| 30 | 0 | 1 | $-i$ | 0 |
|    | 0 | 1 | $i$ | 1 |
| 31 | 0 | 1 | $-i$ | 1 |
|    | 1 | $-i$ | 1 | 0 |
| 32 | 0 | 1 | $i$ | $-i$ |
|    | 1 | $-1$ | 0 | $-i$ |
| 33 | 0 | 1 | $-1$ | $-i$ |
|    | 1 | $-i$ | $-i$ | 0 |
| 34 | 1 | $i$ | $-i$ | 0 |
|    | 1 | 0 | $i$ | $-i$ |
| 35 | 1 | $-1$ | $-i$ | 0 |
|    | 0 | 1 | $-i$ | $i$ |
| 36 | 1 | $i$ | $-i$ | 1 |
|    | 1 | $-i$ | $i$ | 1 |
| 37 | 0 | 1 | $-1$ | $i$ |
|    | 1 | $i$ | $i$ | 0 |
| 38 | 1 | $-i$ | $i$ | 0 |
|    | 0 | 1 | 1 | $-i$ |
| 39 | 1 | $-1$ | 1 | 1 |
|    | 1 | 1 | $-1$ | 1 |
| 40 | 1 | $-1$ | $i$ | $-1$ |
|    | 1 | 1 | $-1$ | $i$ |
| 41 | 1 | $i$ | 1 | $-1$ |
|    | 1 | $-i$ | $i$ | $i$ |
| 42 | 1 | $-i$ | 1 | $-1$ |
|    | 1 | $-1$ | $-1$ | $-i$ |
| 43 | 1 | $-1$ | $-i$ | $-1$ |
|    | 1 | $i$ | $i$ | $-i$ |
| 44 | 1 | 1 | $-i$ | 0 |
|    | 0 | 1 | $i$ | $i$ |
| 45 | 0 | 1 | $-i$ | $-i$ |
|    | 1 | 1 | $i$ | 0 |
| 46 | 1 | 1 | $i$ | $-i$ |
|    | 1 | $-1$ | $-i$ | $-i$ |
| 47 | 0 | 1 | 1 | $i$ |
|    | 0 | 1 | $-1$ | 0 |
| 48 | 1 | $-1$ | 0 | 0 |
|    | 0 | 0 | 1 | $-1$. |

2. The method according to claim 1, wherein said determining, by the terminal, the spread spectrum sequence group for the NOMA multi-layer transmission comprises:

determining, by the terminal, the spread spectrum sequence group for the NOMA multi-layer transmission according to configuration information of the spread spectrum sequence group sent by network equipment;

wherein the configuration information of the spread spectrum sequence group is used for indicating the spread spectrum sequence group configured by the network equipment for the terminal.

3. The method according to claim 1, comprising:
sending, by the terminal, configuration information of the selected spread spectrum sequence group to network equipment.

4. A non-orthogonal multiple access (NOMA) multi-layer transmission method, comprising:
determining, by network equipment, a spread spectrum sequence group used by a terminal for NOMA multi-layer transmission, wherein the terminal is configured for the NOMA multi-layer transmission, the spread spectrum sequence group comprises N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and
receiving, by the network equipment, data sent by the terminal, wherein the data comprises the N data layers using the spread spectrum sequence group for spreading, and during spreading the N data layers, different data layers use different spread spectrum sequences;
wherein the determining, by the network equipment, the spread spectrum sequence group used by the terminal for the NOMA multi-layer transmission comprises:
selecting, by the network equipment, a spread spectrum sequence group for the NOMA multi-layer transmission from a spread spectrum sequence pool for the terminal, wherein the spread spectrum sequence pool comprises M spread spectrum sequence groups, spread spectrum sequences in each of the M spread spectrum sequence groups are mutually orthogonal, and M is an integer greater than 1;
wherein the spread spectrum sequence pool comprises 48 spread spectrum sequence groups, each of the 48 spread spectrum sequence groups comprises two mutually orthogonal spread spectrum sequences, and each of the two spread spectrum sequences comprises four vector elements; and
wherein the spread spectrum sequence pool is shown in a table as follows:

| Spread spectrum sequence group number | Spread spectrum sequence | | | |
|---|---|---|---|---|
| 1 | 1 | i | −1 | −i |
|   | 1 | −i | −1 | i |
| 2 | 1 | −1 | 1 | −1 |
|   | 1 | −1 | −1 | 1 |
| 3 | 1 | −1 | −i | i |
|   | 1 | −1 | i | −i |
| 4 | 1 | i | −i | −1 |
|   | 1 | −i | i | −1 |
| 5 | 1 | i | −i | i |
|   | 0 | 1 | 0 | −1 |
| 6 | 1 | −1 | 1 | i |
|   | 1 | 0 | −1 | 0 |
| 7 | 1 | i | 0 | −1 |
|   | 1 | −i | −1 | 0 |
| 8 | 1 | 0 | i | −1 |
|   | 0 | 1 | −i | −1 |
| 9 | 1 | −i | i | −i |
|   | 1 | −1 | −i | 1 |
| 10 | 1 | −1 | 1 | −i |
|    | 1 | i | −1 | 1 |
| 11 | 1 | 0 | −1 | i |
|    | 0 | 1 | i | −1 |
| 12 | 1 | −i | 0 | i |
|    | 1 | i | −1 | 0 |
| 13 | 0 | 1 | −1 | 1 |
|    | 1 | i | 0 | −i |
| 14 | 1 | −1 | 1 | 0 |
|    | 1 | 0 | −1 | −i |
| 15 | 1 | 0 | −i | −1 |
|    | 1 | 0 | i | 0 |
| 16 | 1 | −i | 0 | −1 |
|    | 0 | 1 | 0 | i |
| 17 | 1 | −i | −1 | 1 |
|    | 1 | 1 | i | −1 |
| 18 | 1 | −1 | i | 1 |
|    | 1 | i | −1 | −1 |
| 19 | 1 | 0 | 0 | −1 |
|    | 1 | −1 | 0 | 1 |
| 20 | 1 | 1 | −i | −1 |
|    | 0 | 0 | 1 | i |
| 21 | 1 | −i | −1 | −1 |
|    | 0 | 1 | i | 0 |
| 22 | 1 | 1 | 0 | −1 |
|    | 1 | 0 | −1 | 1 |
| 23 | 1 | 0 | −1 | −1 |
|    | 1 | i | 1 | 0 |
| 24 | 1 | i | i | −1 |
|    | 0 | 1 | 0 | −i |
| 25 | 1 | i | −1 | i |
|    | 1 | −i | 1 | i |
| 26 | 1 | i | 1 | −i |
|    | 1 | −i | −1 | −i |
| 27 | 1 | 0 | −i | 0 |
|    | 1 | −1 | i | 0 |
| 28 | 1 | −i | −i | −1 |
|    | 1 | i | 0 | 0 |
| 29 | 1 | −i | 0 | 0 |
|    | 0 | 0 | 1 | −i |
| 30 | 0 | 1 | −i | 0 |
|    | 0 | 1 | i | 1 |
| 31 | 0 | 1 | −i | 1 |
|    | 1 | −i | 1 | 0 |
| 32 | 0 | 1 | i | −i |
|    | 1 | −1 | 0 | −i |
| 33 | 0 | 1 | −1 | −i |
|    | 1 | −i | −i | 0 |
| 34 | 1 | i | −i | 0 |
|    | 1 | 0 | i | −i |
| 35 | 1 | −1 | −i | 0 |
|    | 0 | 1 | −i | i |
| 36 | 1 | i | −i | 1 |
|    | 1 | −i | i | 1 |
| 37 | 0 | 1 | −1 | i |
|    | 1 | i | i | 0 |
| 38 | 1 | −i | i | 0 |
|    | 0 | 1 | 1 | −i |
| 39 | 1 | −1 | 1 | 1 |
|    | 1 | 1 | −1 | 1 |
| 40 | 1 | −1 | i | −1 |
|    | 1 | 1 | −1 | i |
| 41 | 1 | i | 1 | −1 |
|    | 1 | −i | i | i |
| 42 | 1 | −i | 1 | −1 |
|    | 1 | −1 | −1 | −i |
| 43 | 1 | −1 | −i | −1 |
|    | 1 | i | i | −i |
| 44 | 1 | 1 | −i | 0 |
|    | 0 | 1 | i | i |
| 45 | 0 | 1 | −i | −i |
|    | 1 | 1 | i | 0 |
| 46 | 1 | 1 | i | −i |
|    | 1 | −1 | −i | −i |
| 47 | 0 | 1 | 1 | i |
|    | 0 | 1 | −1 | 0 |

-continued

| Spread spectrum sequence group number | Spread spectrum sequence | | | |
|---|---|---|---|---|
| 48 | 1 | −1 | 0 | 0 |
|  | 0 | 0 | 1 | −1. |

5. The method according to claim 4, comprising:
sending, by the network equipment, configuration information of the spread spectrum sequence group selected for the terminal to the terminal.

6. The method according to claim 4, wherein said determining, by the network equipment, the spread spectrum sequence group used by the terminal for the NOMA multi-layer transmission comprises:
receiving, by the network equipment, configuration information of the spread spectrum sequence group sent by the terminal, and determining the spread spectrum sequence group used by the terminal for the NOMA multi-layer transmission according to the configuration information of the spread spectrum sequence group;
wherein the spread spectrum sequence group is selected by the terminal from a spread spectrum sequence pool, and the spread spectrum sequence pool comprises M spread spectrum sequence groups, spread spectrum sequences in each of the M spread spectrum sequence groups are mutually orthogonal, and M is an integer greater than 1; wherein the spread spectrum sequence pool is preconfigured or agreed by a system.

7. A communication apparatus, comprising: a processor, a memory, and a transceiver, wherein the processor is configured to read computer instructions in the memory and execute the method of claim 4.

8. The communication apparatus according to claim 7, wherein the processor is configured to:
send configuration information of the spread spectrum sequence group selected for the terminal to the terminal by the transceiver.

9. The communication apparatus according to claim 7, wherein the processor is configured to:
receive configuration information of the spread spectrum sequence group sent by the terminal by the transceiver, and determine the spread spectrum sequence group used by the terminal for the NOMA multi-layer transmission according to the configuration information of the spread spectrum sequence group, wherein the spread spectrum sequence group is selected by the terminal from a spread spectrum sequence pool, and the spread spectrum sequence pool comprises M spread spectrum sequence groups, the spread spectrum sequences in each of the M spread spectrum sequence groups are mutually orthogonal, and M is an integer greater than 1;
wherein the spread spectrum sequence pool is preconfigured or agreed by a system.

10. A communication apparatus, comprising: a processor, a memory, and a transceiver, wherein the processor is configured to read computer instructions in the memory and execute:
determining a spread spectrum sequence group for NOMA multi-layer transmission, wherein a terminal is configured for the NOMA multi-layer transmission, the spread spectrum sequence group comprises N spread spectrum sequences, the N spread spectrum sequences correspond to N data layers, the N spread spectrum sequences are mutually orthogonal, N is a quantity of data layers of the NOMA multi-layer transmission, and N is an integer greater than 1; and
sending data by the transceiver, wherein the data comprises the N data layers using the spread spectrum sequence group for spreading, and during spreading the N data layers, different data layers use different spread spectrum sequences;
wherein the processor is configured to:
select a spread spectrum sequence group for the NOMA multi-layer transmission from a spread spectrum sequence pool, wherein the spread spectrum sequence pool comprises M spread spectrum sequence groups, spread spectrum sequences in each of the M spread spectrum sequence groups are mutually orthogonal, and M is an integer greater than 1; wherein the spread spectrum sequence pool is preconfigured or agreed by a system;
wherein the spread spectrum sequence pool comprises 48 spread spectrum sequence groups, each of the 48 spread spectrum sequence groups comprises two mutually orthogonal spread spectrum sequences, and each of the two spread spectrum sequences comprises four vector elements; and
wherein the spread spectrum sequence pool is shown in a table as follows:

| Spread spectrum sequence group number | Spread spectrum sequence | | | |
|---|---|---|---|---|
| 1 | 1 | i | −1 | −i |
|  | 1 | −i | −1 | i |
| 2 | 1 | −1 | 1 | −1 |
|  | 1 | −1 | −1 | 1 |
| 3 | 1 | −1 | −i | i |
|  | 1 | −1 | i | −i |
| 4 | 1 | i | −i | −1 |
|  | 1 | −i | i | −1 |
| 5 | 1 | i | −i | i |
|  | 0 | 1 | 0 | −1 |
| 6 | 1 | −1 | 1 | i |
|  | 1 | 0 | −1 | 0 |
| 7 | 1 | i | 0 | −1 |
|  | 1 | −i | −1 | 0 |
| 8 | 1 | 0 | i | −1 |
|  | 0 | 1 | −i | −1 |
| 9 | 1 | −i | i | −i |
|  | 1 | −1 | −i | 1 |
| 10 | 1 | −1 | 1 | −i |
|  | 1 | i | −1 | 1 |
| 11 | 1 | 0 | −1 | i |
|  | 0 | 1 | i | −1 |
| 12 | 1 | −i | 0 | i |
|  | 1 | i | −1 | 0 |
| 13 | 0 | 1 | −1 | 1 |
|  | 1 | i | 0 | −i |
| 14 | 1 | −1 | 1 | 0 |
|  | 1 | 0 | −1 | −i |
| 15 | 1 | 0 | −i | −1 |
|  | 1 | 0 | i | 0 |
| 16 | 1 | −i | 0 | −1 |
|  | 0 | 1 | 0 | i |
| 17 | 1 | −i | −1 | 1 |
|  | 1 | 1 | i | −1 |
| 18 | 1 | −1 | i | 1 |
|  | 1 | i | −1 | −1 |
| 19 | 1 | 0 | 0 | −1 |
|  | 1 | −1 | 0 | 1 |
| 20 | 1 | 1 | −i | −1 |
|  | 0 | 0 | 1 | i |

| Spread spectrum sequence group number | Spread spectrum sequence | | | |
|---|---|---|---|---|
| 21 | 1 | −i | −1 | −1 |
|    | 0 | 1  | i  | 0  |
| 22 | 1 | 1  | 0  | −1 |
|    | 1 | 0  | −1 | 1  |
| 23 | 1 | 0  | −1 | −1 |
|    | 1 | i  | 1  | 0  |
| 24 | 1 | i  | i  | −1 |
|    | 0 | 1  | 0  | −i |
| 25 | 1 | i  | −1 | i  |
|    | 1 | −i | 1  | i  |
| 26 | 1 | i  | 1  | −i |
|    | 1 | −i | −1 | −i |
| 27 | 1 | 0  | −i | 0  |
|    | 1 | −1 | i  | 0  |
| 28 | 1 | −i | −i | −1 |
|    | 1 | i  | 0  | 0  |
| 29 | 1 | −i | 0  | 0  |
|    | 0 | 0  | 1  | −i |
| 30 | 0 | 1  | −i | 0  |
|    | 0 | 1  | i  | 1  |
| 31 | 0 | 1  | −i | 1  |
|    | 1 | −i | 1  | 0  |
| 32 | 0 | 1  | i  | −i |
|    | 1 | −1 | 0  | −i |
| 33 | 0 | 1  | −1 | −i |
|    | 1 | −i | −i | 0  |
| 34 | 1 | i  | −i | 0  |
|    | 1 | 0  | i  | −i |
| 35 | 1 | −1 | −i | 0  |
|    | 0 | 1  | −i | i  |
| 36 | 1 | i  | −i | 1  |
|    | 1 | −i | i  | 1  |
| 37 | 0 | 1  | −1 | i  |
|    | 1 | i  | i  | 0  |
| 38 | 1 | −i | i  | 0  |
|    | 0 | 1  | 1  | −i |
| 39 | 1 | −1 | 1  | 1  |
|    | 1 | 1  | −1 | 1  |
| 40 | 1 | −1 | i  | −1 |
|    | 1 | 1  | −1 | i  |
| 41 | 1 | i  | 1  | −1 |
|    | 1 | −i | i  | i  |
| 42 | 1 | −i | 1  | −1 |
|    | 1 | −1 | −1 | −i |
| 43 | 1 | −1 | −i | −1 |
|    | 1 | i  | i  | −i |
| 44 | 1 | 1  | −i | 0  |
|    | 0 | 1  | i  | i  |
| 45 | 0 | 1  | −i | −i |
|    | 1 | 1  | i  | 0  |
| 46 | 1 | 1  | i  | −i |
|    | 1 | −1 | −i | −i |
| 47 | 0 | 1  | 1  | i  |
|    | 0 | 1  | −1 | 0  |
| 48 | 1 | −1 | 0  | 0  |
|    | 0 | 0  | 1  | −1. |

11. The communication apparatus according to claim 10, wherein the processor is configured to:
   determine the spread spectrum sequence group for the NOMA multi-layer transmission according to configuration information of the spread spectrum sequence group sent by network equipment;
   wherein the configuration information of the spread spectrum sequence group is used for indicating the spread spectrum sequence group configured by the network equipment for the terminal.

12. The communication apparatus according to claim 10, wherein the processor is configured to:
   send configuration information of the selected spread spectrum sequence group to network equipment by the transceiver.

* * * * *